US008838317B2

(12) United States Patent
Okuda

(10) Patent No.: US 8,838,317 B2
(45) Date of Patent: Sep. 16, 2014

(54) HYBRID-VEHICLE CONTROL DEVICE
(75) Inventor: Tadashi Okuda, Hadano (JP)
(73) Assignee: Nissan Motor Co., Ltd., Yokohama-shi, Kanagawa (JP)
(*) Notice: Subject to any disclaimer, the term of this patent is extended or adjusted under 35 U.S.C. 154(b) by 86 days.
(21) Appl. No.: 13/810,983
(22) PCT Filed: Jul. 20, 2011
(86) PCT No.: PCT/JP2011/066458
§ 371 (c)(1),
(2), (4) Date: Mar. 4, 2013
(87) PCT Pub. No.: WO2012/011495
PCT Pub. Date: Jan. 26, 2012
(65) Prior Publication Data
US 2013/0158766 A1 Jun. 20, 2013
(30) Foreign Application Priority Data
Jul. 21, 2010 (JP) ................................ 2010-164191
(51) Int. Cl.
B60W 20/00 (2006.01)
B60W 10/08 (2006.01)
B60W 10/06 (2006.01)
B60K 6/48 (2007.10)
B60W 10/10 (2012.01)
B60W 30/192 (2012.01)
B60W 10/02 (2006.01)
F02D 29/00 (2006.01)
B60L 11/12 (2006.01)
F02N 11/00 (2006.01)
F16H 61/02 (2006.01)
(52) U.S. Cl.
CPC .............. B60W 20/20 (2013.01); B60W 20/00 (2013.01); F02N 2200/0802 (2013.01); F02N 2300/104 (2013.01); Y02T 10/6221 (2013.01); B60L 2240/486 (2013.01); Y02T 10/6286 (2013.01); F02N 11/00 (2013.01); B60W 10/08 (2013.01); B60W 10/06 (2013.01); F02N 2200/042 (2013.01); B60W 2600/00 (2013.01); B60L 2260/26 (2013.01); B60K 6/48 (2013.01); B60L 2240/443 (2013.01); Y10S 903/93 (2013.01); B60W 10/10 (2013.01); B60W 2510/1005 (2013.01); B60W 2710/105 (2013.01); B60W 30/192 (2013.01); B60W 2710/0644 (2013.01); B60W 10/02 (2013.01); F02D 29/00 (2013.01); B60L 11/12 (2013.01); F16H 2061/023 (2013.01)
USPC ......................... 701/22; 180/65.265; 903/930
(58) Field of Classification Search
USPC ..................................................... 701/65.265
See application file for complete search history.

(56) References Cited

U.S. PATENT DOCUMENTS

2010/0138086 A1* 6/2010 Imamura et al. ................ 701/22

FOREIGN PATENT DOCUMENTS

| JP | 2007-131070 A | 5/2007 |
| JP | 2008-044521 A | 2/2008 |
| JP | 2008-105494 A | 5/2008 |
| JP | 2010-149783 A | 7/2010 |

* cited by examiner

Primary Examiner — Mary Cheung
Assistant Examiner — Yuen Wong
(74) Attorney, Agent, or Firm — Young Basile

(57) ABSTRACT

Provided is a hybrid-vehicle control device that can continue high-speed driving, without transitioning to the HEV mode, by raising the motor torque limit during driving in the EV mode. The hybrid-vehicle control device includes: an engine; a motor that starts the engine and that drives driving wheels; a first clutch that switches between the HEV mode and the EV mode; an automatic transmission; and an electric-vehicle mode control means. The smaller the transmission ratio of the transmission is during driving in the EV mode, the smaller the value of the engine start torque, which is reserved for transitioning to the HEV mode, is made by the electric-vehicle mode control means.

7 Claims, 7 Drawing Sheets

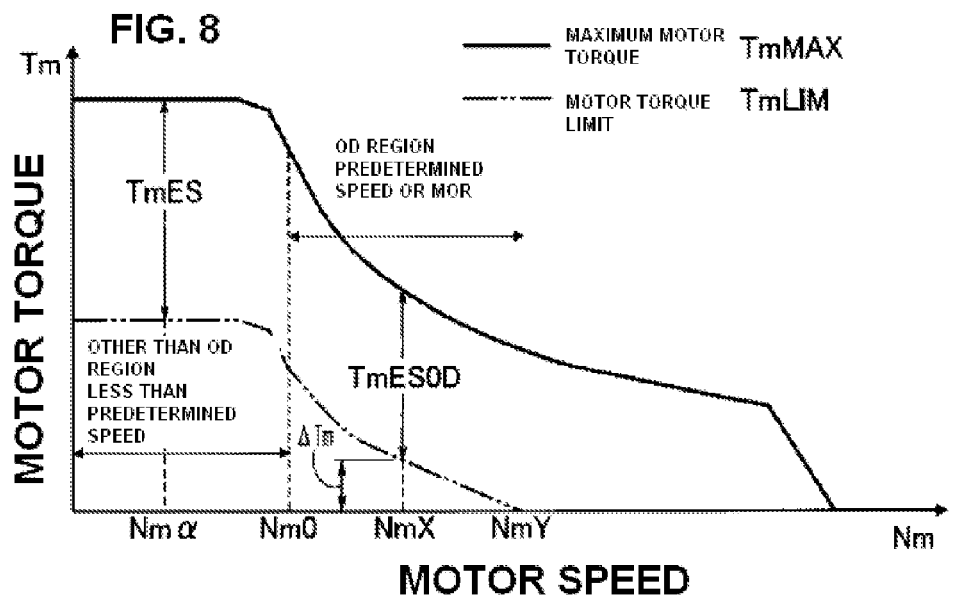
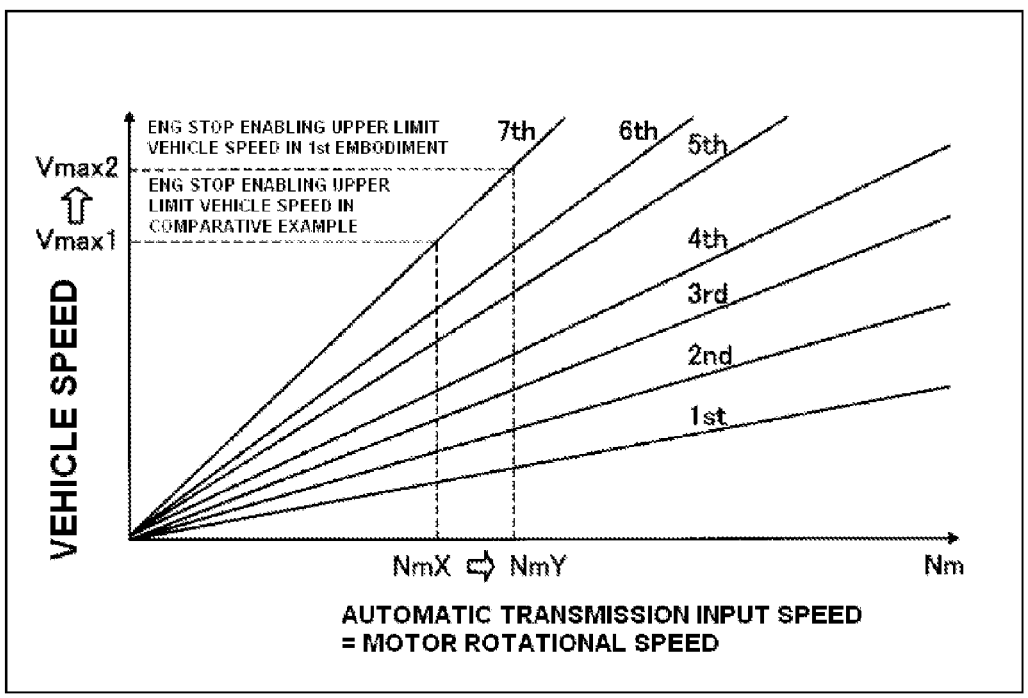

HYBRID-VEHICLE CONTROL DEVICE

TECHNICAL FIELD

The present invention relates in general to a control device for a hybrid vehicle for controlling torque for engine startup torque in an electric driving mode using a motor as drive source.

BACKGROUND

A conventional control device is known in which an engine is started to transition from an electric vehicle (EV) mode to a hybrid electric vehicle (HEV) mode when the motor torque limit obtained by subtracting a constant engine startup torque from the maximum motor torque falls below a required driving torque (for example, see Japanese Unexamined Patent Application Publication, JP No. 2008-105494).

However, in the conventional control device of hybrid vehicle, the motor torque limit available as motor torque in the EV mode is restricted by the torque for engine startup, the motor torque limit could not be increased. For this reason, there is a problem that, during a high speed travel, an increase in required drive torque requires a transition to the HEV mode.

BRIEF SUMMARY

The present invention has been made by focusing on the problem described above, and has the object of providing a control device for the HEV in which, by increasing the motor torque limit, a high speed travel may be maintained without transitioning to the HEV mode.

To achieve the above object, the control device according to the present invention comprises: an engine, a motor that starts up the engine and drives driving wheels, a mode switching mechanism between the HEV mode and EV mode, a transmission, and an EV mode control mechanism.

In addition, the EV mode control mechanism is configured, during a travel in the EV mode and the transmission ratio being at a predetermined value or less, to set the value of engine startup torque set aside or preserved for transition to the HEV mode to a smaller torque than required for the engine startup. Further, as a transmission ratio of the transmission decreases, the engine startup torque is made smaller while the clutch engagement capacity of a clutch selectively engaged at the downstream of the motor being reduced by a difference between the required torque for engine startup and the set torque for engine startup thereby the torque necessary for engine startup will be compensated for to enable an engine startup.

In the control device for hybrid vehicle according to the present invention, while driving in the EV mode, the EV mode control unit sets the value of engine startup torque to assume a smaller value as the transmission ratio becomes smaller.

Specifically, the motor torque limit available as a motor torque in EV mode is obtained as a value by subtracting the motor torque for the engine startup from the maximum motor torque. Therefore, a smaller value of engine startup torque will increase the motor torque limit so that the motor torque available in the EV mode will be increased. Thus, during high speed travel, the vehicle can travel without a mode transition even at a higher amount of required torque.

Moreover, the shock associated with an engine start occurring during a mode switch from EV mode to the HEV mode is reduced as the transmission ratio of the transmission decreases. Therefore, at a low transmission ratio, even if the engine startup torque is set to a small value, and torque necessary for engine startup is compensated for by holding an engagement capacity of a clutch disposed downstream of the motor smaller so that the accompanied engine start shock will not be significantly different from the level of that with a higher transmission ratio.

As a result, it is possible to maintain a high-speed running or travel without having to mode transition to a HEV mode by increasing the motor torque limit during the high speed travel.

BRIEF DESCRIPTION OF THE DRAWINGS

The description herein makes reference to the accompanying drawings wherein like reference numerals refer to like parts throughout the several views, and wherein:

FIG. 8 is a characteristic diagrams showing a maximum motor torque, engine startup torque, and motor torque limit set in the control device of HEV in the first embodiment;

FIG. 9 shows characteristics of respective transmission steps determined by both a transmission input speed and a vehicle speed, a diagram showing the upper limit of vehicle speed for engine stop in a comparative example and the upper limit of vehicle speed for engine stop in the first embodiment;

DETAILED DESCRIPTION

Figure 1:
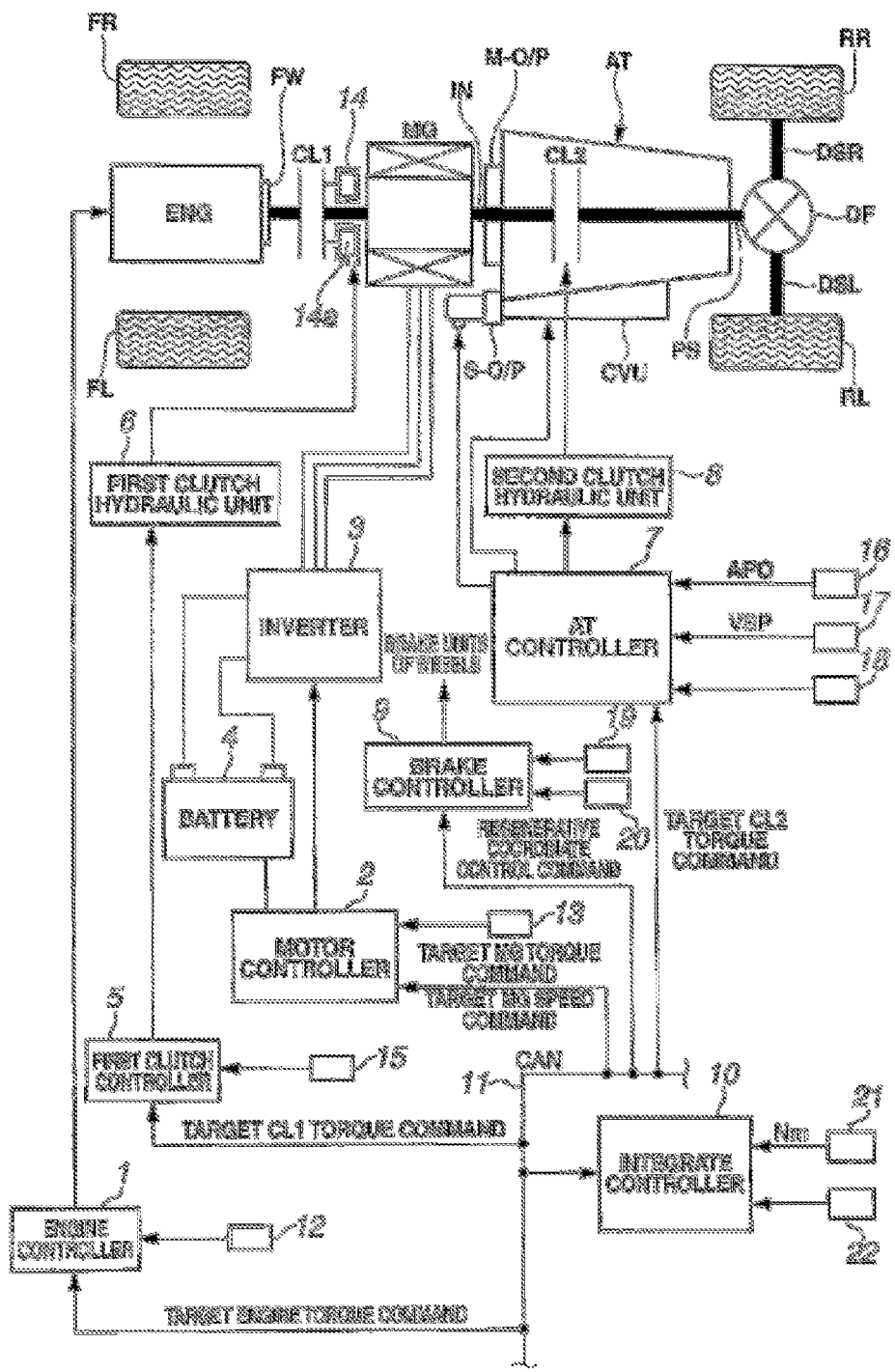
FIG. 1 shows an overall system diagram illustrating a rear wheel driven FR hybrid vehicle (an example of hybrid vehicle) to which a control device of the first embodiment is applied.

In the following, an explanation is made of the best embodiment for implementing the control device of hybrid vehicle according to the present invention with reference to a first embodiment shown in the drawings.

FIG. 1 is an overall system diagram showing a vehicle with a rear wheel-drive FR hybrid vehicle (an example of the hybrid vehicle) to which is applied a control device according to the present invention.

The driveline of the FR hybrid vehicle in the first embodiment includes, as shown in FIG. 1, an engine Eng, a flywheel FW, a first clutch CL1 (mode switching means), a motor/generator MG (motor), a second clutch CL2, an automatic transmission (transmission) AT, a transmission input shaft IN, a mechanical oil pump M-O/P, a sub-oil pump S-O/P, a differential DF, a left driving shaft DSL, right drive shaft DSR, a left rear wheel RL (drive wheel), and right rear wheel (drive wheel). Incidentally, FL is the left front wheel, FR is the right front wheel.

The engine ENG is either a gasoline or diesel engine, and several controls are performed such as an engine startup control, engine stop control, a throttle valve opening control, and a fuel cut-off control, based on the instruction from an engine controller 1. Incidentally, the engine output shaft is provided with a flywheel FW.

The first clutch is interposed between the engine ENG and the motor/generator MG, and is controlled with respect to its engagement, half-engagement, and release state based on a hydraulic pressure produced by a first clutch hydraulic unit 6 in response to a first control instruction from a first clutch controller 5. As the first clutch CL1, a dry single disc clutch of normal closed type is used in which a complete engagement is maintained by a biasing force due to such as a diaphragm spring while a selective control among an engagement, half-engagement and release states will be made through a hydraulic actuator 14 having a piston 14a. In addition, the first clutch CL1 is provided in the connecting portion between the motor/generator MG and the engine EngCL1 presents a mode switching mechanism and is selectively switched either in a hybrid vehicle mode propelled by both the engine and motor/generator MG as drive source or in the EV mode operated by motor/generator MG as drive source.

The motor/generator MG is a synchronous motor/generator within permanent magnets embedded in a rotor while a stator coil being wound around a stator, and is subjected to be controlled by applying a three-phase alternating current created by an inverter 3. This motor/generator MG is driven to rotate in response to power supply from battery 4 to act as a motor to drive left and right driving wheels RL, RR (driving operation), and, when the rotor receives a rotating energy from engine ENG or left and right wheels RL, RR, then the motor/generator also functions as a generator to generate an electromotive force at both ends of the stator coil to charge the battery (regenerative operation). In addition, the rotor of motor/generator MG is connected to the transmission input IN of automatic transmission AT, and is also selectively connected to engine ENG via the first clutch CL1.

The second clutch CL2 above is such a clutch which is interposed between the motor/generator MG and the left and right rear wheels RL, RR, engageable at the downstream of the motor/generator MG, and is subjected to a hydraulic pressure produced by the second clutch hydraulic unit 8 based on a second clutch control instruction from AT controller 2 for controlling its engagement, slip-engagement, and release states. As this second clutch CL2, a multi-plate wet type clutch or a multi-plate wet type brake of the normally open type may be used in which hydraulic oil flow or hydraulic pressure may be continuously controlled by way of a proportional or linear solenoid. In addition, both the first clutch hydraulic unit 6 and the second clutch hydraulic unit 8 are accommodated in the hydraulic control valve unit CVU, which is attached to automatic transmission AT.

The automatic transmission AT is interposed between motor/generator MG and the left/right driving wheels RL, RR, and is a step transmission of which multi-step transmission ratios as automatically subjected to change based on a vehicle speed and accelerator openness, etc. In the first embodiment, this automatic transmission AT has a stepped transmission with seven forward/one step rearward transmission steps.

Here, the first to fifth transmission ratios are set to have an transmission ratio 1 or more so as to be under drive transmission ratios, the sixth is set to a equal to 1 as an equal speed transmission step, and the uppermost step, the seventh transmission ratio is set to be transmission ratio of one or less as an overdrive transmission ratio (referred to OD step, below). Further, in the first embodiment, the second clutch CL2 is not newly added as an independent, dedicated clutch, but is commonly used with the components of automatic transmission AT by selecting a suitable friction element (clutches and brakes) for a predetermined condition out of a plurality of friction elements engaged at respective transmission ratios of automatic transmission AT.

To transmission input shaft IN (i.e., motor shaft) of the automatic transmission is connected a mechanical oil pump M-O/P driven by the transmission input shaft IN. Moreover, when the discharge pressure from the mechanical oil pump MO/P is insufficient when the vehicle is stopped or the like, the sub-oil pump S-O/P is provided in a motor housing or the like to be driven by an electric motor in order to prevent decrease in hydraulic pressure.

In addition, the drive control of the sub oil pump S-O/P is carried out by AT controller 7 as will be described later.

The transmission output shaft of the automatic transmission AT is connected to a propeller shaft PS. In addition, this propeller shaft PS is further connected to the left and right rear wheels RL, RR through a differential gear DF, left drive shaft DSL, and right drive shaft DSR.

The FR hybrid vehicle has the modes of, depending on the difference in the form of a driving mode, an electric vehicle mode (referred to "EV mode" hereinafter), hybrid vehicle mode (hereinafter referred to "HEV mode"), and a drive torque control mode (hereinafter referred to "WSC mode").

The EV mode is such a drive mode driven only be the driving force of motor/generator MG with the first clutch CL1 released, and includes a motor drive mode and a regenerative drive mode. This EV mode is selected when a required drive torque is low and the battery SOC is secured.

The HEV mode is such a mode in which the vehicle travels with the first clutch CL1 engaged, and travels by selecting one of a motor-assist mode, generating drive mode and engine drive mode. The HEV mode is selected when a required amount of torque is high or battery SOC is insufficient.

The WSC mode is such a mode in which the vehicle travels by maintaining the second clutch CL2 in a slip-engagement state and controlling a clutch torque capacity so that the transmission torque passing through the second clutch CL2 meets the required drive torque determined based on vehicle state and driver's operations. The WSC mode is selected at a running region in which engine speed falls below an idle rotation speed such as at a start, stop or deceleration with the HEV mode being selected.

Now, a description is made of a control system of the FR hybrid vehicle. As shown in FIG. 1, the control system of FR hybrid vehicle in the first embodiment is configured to have an engine controller 1, a motor controller 2, an inverter 3, a battery 4, a first clutch controller 5, a first clutch hydraulic unit 6, an AT controller, a second clutch hydraulic pressure unit 8, a brake controller 9, and an integrated controller 10.

Note that respective controllers 1, 2, 5, 7 and 9 and integrated controller 10 are interconnected to each other via a CAN communication line for mutual information exchange.

The engine controller 1 receives an engine speed information (detected speed signal) from an engine rotational speed sensor (engine speed detecting means) 12, a target engine torque instruction or command from integrated controller 10 and other necessary information. Subsequently, a command signal to control an engine operation point (Ne, Te) is output to a throttle valve actuator and the like of the engine ENG.

The motor controller 2 receives information of resolver 13 for detecting a rotor rotational position of motor/generator MG, a target MG torque command and a target MG rotational speed command, and other necessary information. Subsequently, a control instruction or command to control the operational point (Nm, Tm) of motor/generator MG is transmitted to inverter 3. Note that the motor controller 2 monitors a battery SOC representing a charged amount of battery 4 and supplies the battery SOC information to integrated controller 10 via the CAN communication line.

The first clutch controller 5 receives sensor information from the first clutch stroke sensor 15 to detect a stroke position of piston 14a of hydraulic actuator 14, a target CL1 torque command from integrated controller 10, and other necessary information. Subsequently, a command to control the state of engagement, half-engagement, and release of the first clutch CL1 is output to the first clutch hydraulic unit 6 in hydraulic control valve unit CVU.

The AT controller 7 receives information from accelerator opening sensor 16, vehicle speed sensor 17 and other sensors 18.

Figure 2:
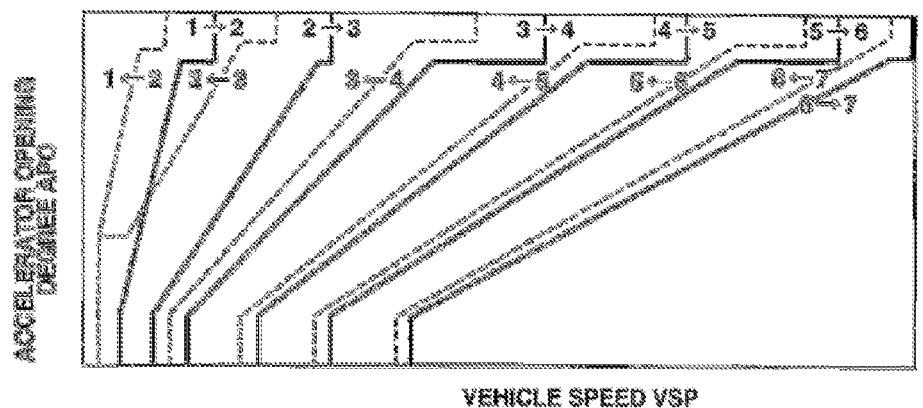
FIG. 2 shows a schematic diagram of an example of shift map of the automatic transmission incorporated in the transmission controller of the first embodiment.

Then, the AT controller 17 searches for an optimum transmission step at the time of traveling by selecting D-range, positioned on the shift map shown in FIG. 2 according to the vehicle speed VSP and accelerator opening APO and outputs to hydraulic pressure control valve unit CVU a control instruction to obtain the searched transmission step. The shift map means a map written with up-shift lines and down-shift lines depending on accelerator opening APO and vehicle speed VSP.

In addition to this transmission control, a second clutch control is performed, upon receipt of target CL2 torque command from integrated controller 10, by supplying a slip engagement control command for the second clutch CL2 to the second clutch hydraulic unit 8 of hydraulic control valve unit CVU.

Further, in the engine start control and the like, when the shift control command is output from the integrated controller 10, the shift control takes precedence over the normal transmission control and a control is performed according to the shift control command.

The brake controller 9 receives sensor signals from a wheel speed sensor 19 to detect four respective wheel speeds and from brake stroke sensor 20 together with a regenerative collaborative control command from integrated controller 10, and other necessary information. In addition, for example, at depression on brake for braking, when a regenerative braking force is not sufficient for the required braking force obtainable from brake stroke BS, the shortfall will be supplemented by a mechanical brake (hydraulic pressure braking force or motor assisted braking force) by a regenerative collaborative or cooperative braking control.

The integrated controller 10 is responsible for managing the energy consumption of the entire vehicle to drive the vehicle at the best efficiency, and receives necessary information such as from a motor rotational speed sensor 21 for detecting motor rotational speed Nm and other sensors/switches. Moreover, the integrated controller 10 outputs a target engine torque command to engine controller 1, a target MG torque command and a target MG rotation controller 5, a target CL2 torque, and a regenerative cooperative control command to brake controller 9.

Figure 3:
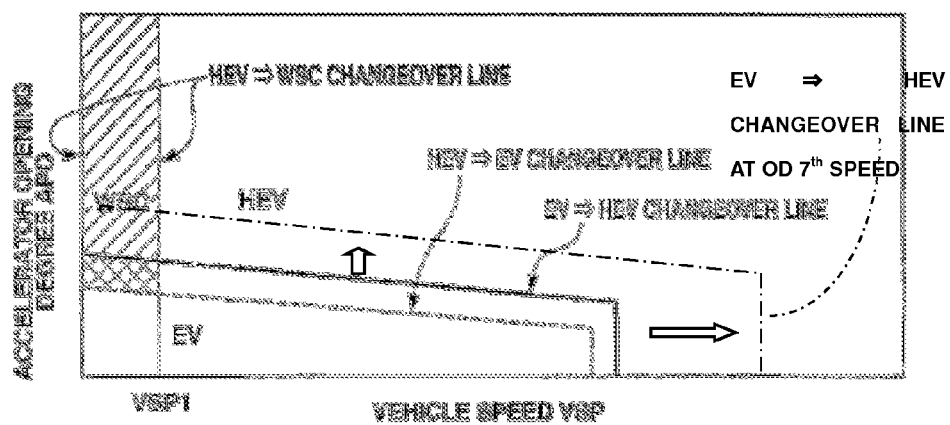
FIG. 3 shows a schematic diagram of an example of EV-HEV switch or select map incorporated in the integrated or unified controller of the first embodiment.

The integrated controller 10 has a mode selection unit for searching for an optimum mode by locating a position present on EV-HEV selection map shown in FIG. 3 determined in accordance with accelerator opening APO and vehicle speed VSP and selects the searched travel mode as a target drive mode. This EV-HEV selection map are provided with an EV to HEV switching line for transitioning from EV mode to HEV mode when the operation point (APO, VSP) present in EV area or region crosses or interchanges, a HEV to EV switching line from HEV mode to EV mode when the operation point (APO. VSP) present in HEV area crosses, and a HEV to WSC switching line to WSC mode, at HEV mode being selected, when the operation point (APO, VSP) enters WSC area, respectively. Note that the EV to HEV switching line indicated in dashed line at OD shift step (seventh step) being selected, expands the EV operation area than the EV to HEV switching lines at other shift steps as detailed below.

In addition, the EV to HEV switching line and the HEV to EV switching line represent borderlines separating EV area and HEV area and arranged to each other with hysteresis. The HEV to WSC switching line is set along the first set vehicle speeds at which engine ENG may maintain an idle speed, with the automatic transmission maintained at idle speed. However, during the selection of the "EV mode", when the battery SOC is less than a predetermined value, the "HEV mode" will be selected compulsorily.

Figure 4:
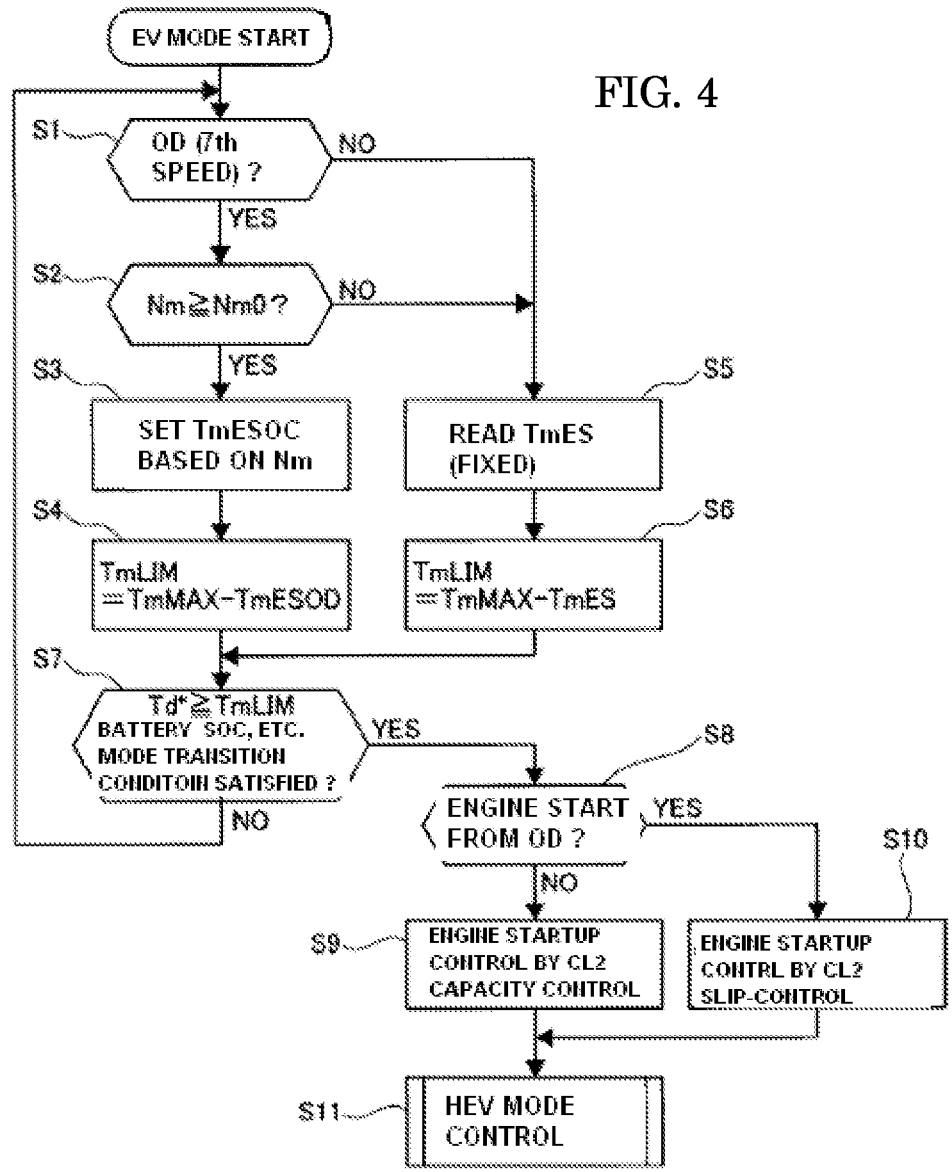
FIG. 4 shows a flowchart illustrating the flow of process of EV mode control executed by the integrated controller of the first embodiment.

FIG. 4 shows a flowchart indicating a flow of EV mode control process executed by integrated controller of the first embodiment. Now, an explanation is made of respective steps in FIG. 4. Note that this EV mode control process starts with EV mode since the process will be executed during travel in EV mode.

In step S1, a determination is made as to whether or not the transmission or shift step selected by automatic transmission AT is OD shift step (seventh speed), and if determined "YES" (i.e., OD shift step is in operation), then control proceeds to step S2, while if determined "NO" (operating in other than OD step), then the control proceeds to step S5. Here the selected shift step is determined or located on the shift map (see FIG. 2) determined on the basis of accelerator opening APO and a vehicle speed VSP.

In step S2, following the determination in step S2 that OD transmission step is at OD shift step, a determination is made as to whether or not motor speed Nm exceeds a predetermined speed Nm0, and, if "YES" (i.e., exceeds the predetermined speed, Nm0), control proceeds to step S3 while, if determined "NO" (less than the predetermined speed, Nm0), the control proceeds to step S5. Note that the predetermined speed Nm0 corresponds to such a rotation speed corresponding to vehicle speed of 80 km/h.

In step S3, following the determination in step S2 that Nm equals to or greater than Nm0, engine startup torque at OD shift step (hereinafter, referred to as OD start torque) TmESOD, and the control proceeds to step S4.

The "engine startup torque" is a motor torque reserved during a travel in EV mode for engine start up in preparation for a mode transition to HEV mode. In addition, the "engine startup torque at OD shift step selection (OD start torque)" is an engine startup torque set at OD shift step selection and is defined based on motor rotation speed Nm and engine startup torque setting map shown in FIG. 5. The OD start torque TmESOD will be smaller than the motor torque required for engine start.

Furthermore, the engine startup torque setting map has a characteristic in which OD start torque TmESOD will be set smaller as the motor rotational speed Nm is higher. In addition, the reduction rate of OD starting torque TmESOD in this engine startup torque setting map is set greater between the motor rotational speed Nm1 (corresponding to vehicle speed 100 km/h) and Nm2 (corresponding to vehicle speed 140 km/h) as compared to that between the motor rotational speed Nm0 (corresponding to vehicle speed 80 km/h) and Nm1 (corresponding to vehicle speed 100 km/h).

In step S4, following the setting of OD start torque TmE-SOD in step S3, the process calculates motor torque limit TmLIM by subtracting OF starting torque TmESOD from maximum motor torque TmMAX and proceeds to step S7. Note that the "maximum motor torque" is maximum available torque for output by motor/generator MG, while the "motor torque limit" is a motor torque available by motor/generator MG during travel in EV mode.

In step S5, following the determination in step S1 that other than OD step is in operation or the determination in step S2 that Nm is smaller than Nm0, a normal engine startup torque (hereinafter referred to normal starting torque) TmES is read and control proceeds to step S6. Note that the normal starting torque TmES is such a torque at motor rotational speed Nm being Nm0 (corresponding to vehicle speed 80 km/h). This normal starting torque TmES meets the required torque for engine startup and presents a fixed value (constant value), irrespective of motor rotational speed.

In step S6, following the reading of the normal starting torque TmES in step S5, the motor torque limit TmLIM is calculated by subtracting the normal starting torque TmES from the maximum motor torque TmMAX, and control proceeds to step S7.

In step S7, following the calculation of motor torque limit TmLIM either in step S4 or step S6, a determination is made whether or not a mode transition conditions are met including a required drive torque condition, battery SOC condition, and, if YES (conditions met), control proceeds to step S8, while, if NO (conditions unsatisfied) control returns to step S1 for continuing an EV mode travel.

Note that the determination of the "required drive torque conditions" is made whether the required drive torque Td* exceeds motor torque limit TmLIM or not. If Td* is equal to or greater than TmLIM, in EV mode, the motor toque available from motor/generator MG does not suffice, i.e., a shortfall occurs, a mode transition condition is thus determined to exist due to inability to continue EV mode travel. On the other hand, if Td* is less than TmLIM, the motor torque available from motor/generator for use of the required drive torque is held sufficient and the determination will be made that no mode transition conditions exist and therefore a continued EV mode travel is possible.

Moreover, the determination regarding the "battery SOC condition" is made depending on battery SOC being less than a predetermined value. When battery SOC is below the predetermined value, EV mode travel is not possible because of lack of charged amount of battery 4, and therefore a determination will be made that the mode transition condition exists. On the other hand, at battery SOC exceeding the predetermined value, the charged amount of battery will be held sufficient and EV mode travel sustainable, and thus with no existence of the mode transition conditions.

In step S8, following the determination in step S7 of satisfaction of required conditions, a determination is made whether or not the involved engine starting is from OD transmission step or not, and if held "YES" (i.e., starting from OD), control proceeds to step S10 while in the case of "NO" (i.e., starting from other than OD), control proceeds to step S9.

Note that the determination as to whether the engine startup is form OD step or not is performed based on the judgment of the transmission ratio in step S1.

In step S9, following the determination of the start from the non-OD at step S8, engine start up control is performed while controlling the engagement capacity of the second clutch CL2, and the process advances to HEV mode control in step S11.

Note that the "engagement capacity control of the second clutch CL2" is intended to mean to control clutch engagement capacity of the clutch transmission torque passing through the second clutch CL2 meets the drive torque transmitted to driving wheels RL, RR. In this instance, when a torque transmission is detected more than the control torque, then the second clutch CL2 will be slip-engaged to suppress the engine start shock.

In Step S10, following the determination in step S8 of the start from the OD, the slip control of the second clutch CL2 will be performed to control engine start by securing the torque required to start the engine, and the process proceeds and transitions to HEV mode control in S11.

Figure 6:
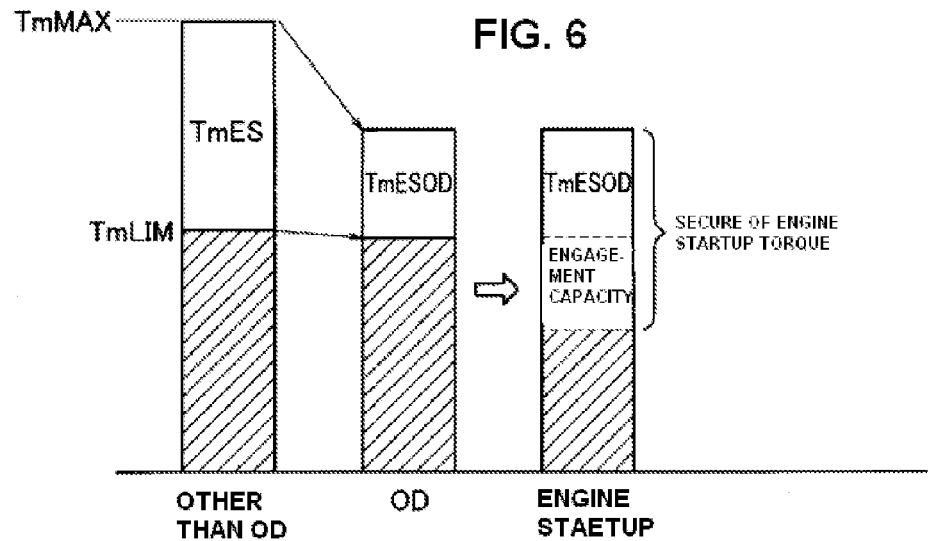
FIG. 6 is an explanatory view showing a state of the motor torque controlled by the control device of hybrid vehicle according to the first embodiment.

Note that the "second clutch CL2 slip control" is composed of compensating for a difference of torque between the torque required for engine ENG startup and OD starting torque TmESOD by reducing the clutch engagement capacity of the second clutch CL2 and thus reducing the clutch transmission torque passing through the second clutch CL2 to obtain that difference. That is, as shown in FIG. 6, because the OD start torque TmESPD falls below the torque value necessary for engine starting, the OD start torque TmESOD alone is not sufficient for starting the engine ENG. Thus, at engine startup from OD, the clutch transmission torque passing through the second clutch CL2 will be reduced to slip the second clutch CL2. Hence, through the slip of the second clutch CL2, such a motor torque not reaching driving wheels will be made as surplus torque secured for engine startup torque.

Now, the operations will be explained. First, a description is made of the "EV mode control according to Comparative Example 1" along with the "EV mode driving mechanism 1" according to the present invention", followed by a description of operations in the HEV control device in the first embodiment is made with respect to "Non-OD engine startup torque setting operation", "OD engine startup torque setting operation at engine speed NmX", and "OD engine startup torque at engine rotational speed NmY" will be made respectively.

Figure 7:
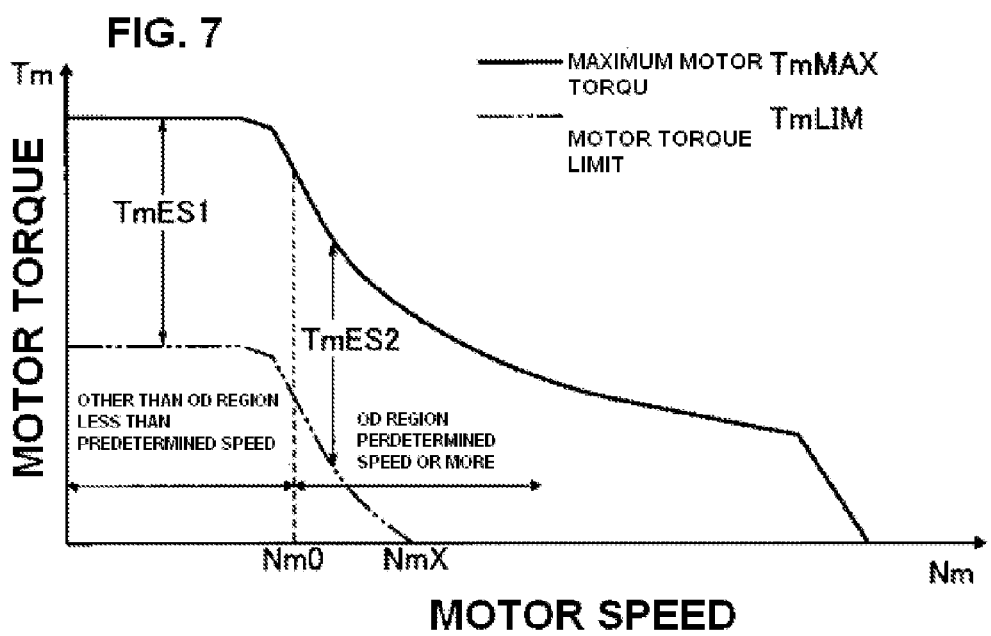
FIG. 7 is a characteristic diagrams showing a maximum motor torque, engine startup torque, and motor torque limit set in the control device of HEV in the first embodiment.

FIG. 7 is a characteristic diagram showing a maximum motor torque, engine startup torque, and motor torque limit in the hybrid vehicle control device of Comparative Example 1.

In the hybrid vehicle mode in Comparative Example 1, during travel in EV mode, the engine startup torque set aside in preparation for the mode transition to HEV mode will be made fixed value (i.e., constant) regardless of the transmission ratio of the automatic transmission AT.

Thus, the engine startup torque TmES1 at motor rotation speed Nm less than the predetermined threshold Nm0 with the automatic transmission AT being selected in other than OD step, and the engine start up torque TmES2 at motor rotation speed more than the predetermined speed threshold Nm0 with the automatic transmission AT being selected in OD stage are of the same value.

On the other hand, the motor torque available at the motor/generator MG during EV driving mode is motor torque limit TmLIM obtainable by subtracting the engine startup torque from the maximum motor torque, TmMAX. Then, when the motor torque limit TmLIM becomes zero, the vehicle will not be able to travel in EV mode regardless of the value of the required driving torque Td*, it is necessary to transition a mode to the HEV mode by starting the engine. Therefore, the vehicle speed determined by the motor rotational speed, NmX at the motor torque TmLIM limit being zero (e.g., Vmax1 at OD transmission step (seventh speed; see FIG. 9) will be defined as engine stop enabling upper limit vehicle speed.

In a hybrid vehicle having an automatic transmission AT, during running at a constant speed in the high vehicle speed range higher than 70 km/h, the transmission ratio selected by the automatic transmission AT is generally the uppermost step or OD step, and the transmission ration is often equal to or less than 1.0.

Here, an assumption is made that the seventh speed is OD transmission step, and its transmission ratio at 0.8000, vehicle weight at 2000 kg, inertia of engine ENG at 0.04 kgm2, and engine starting time at 0.5 sec.

When the hybrid vehicle such as this has selected a transmission ratio other than the OD, in other words, when the transmission ratio is greater than when the OD transmission ratio, an engine startup torque will be secured and startup control of engine ENG by thus secured engine startup torque will be performed.

At this time, in order for the clutch-transmission torque passing through the second clutch CL2 to be corresponding to the drive torque transmitted to driving wheels RL, RR during the transition mode, the capacity of clutch engagement of the second clutch CL2 is controlled. Then, the second clutch CL2 will be slipped when the torque transmission of more than the driving torque occurs to prevent engine start shocks. In the engine startup control such as this, while absorbing a torque fluctuation due to the starting of the engine and holding a second clutch CL2 to slip, the drive torque transmitted to the drive wheels RL, RR is to be secured. Therefore, the shock occurring in the vehicle engine start does not occur and is almost 0 G.

Then, when the automatic transmission AT has selected the OD ratio, i.e., when the transmission ratio in place is less than non-OD ratio, engine start control is performed by slip controlling the second clutch CL2 without securing little engine startup torque.

That is, the second clutch CL2 is slip-engaged, thereby the torque transmitted through the second clutch CL2 will be reduced. Thu, engine startup torque is compensated for by the extra torque not transmitted to driving wheels R1, RR and engine ENG will be started by this engine startup torque.

At this time, the motor torque equivalent to compensation of the torque for the engine start will not be transmitted to driving wheels RL, RR, since the transmission ratio of the automatic transmission AT is less than or equal to 1.00, the engine start shock occurring in the vehicle is about 0.05 G or below that people can feel.

In this way, when the automatic transmission AT selects OD step with a low transmission ratio, as compared to when other than OD is selected with a high speed ratio, the engine startup torque reserved for mode transition to HEV mode will be made of smaller value. In this instance, by performing a slip-control of the second clutch CL2, the compensation of engine startup torque by the motor torque not transmitted to driving wheels RL, RR would not pose a problem due to a lower value of transmission ratio.

However, some people may feel the engine start shock at this time. Therefore, it is necessary to suppress the shock occurring at engine start, setting the engine startup torque for reservation in advance to zero may not be possible.

In addition, by holding the engine startup torque of small value, the motor torque limit subtracting the engine startup torque from maximum motor torque will be set relatively large. When the motor torque limit becomes large, motor speed at which this motor torque limit is zero may be increased. As a result, the vehicle speed determined by the rotation speed of the motor when the motor torque limit has been made to zero, i.e., engine stop enabling upper vehicle speed may be increased for a continued travel at high vehicle speed. Moreover, the vehicle speed area or region in which a travel without transitioning to HEV mode is possible may be expanded, and, as shown in FIG. 3, the EV to HEV switching line may expanded during OD transmission step operation.

FIG. 8 is a characteristic diagram showing a maximum motor torque, engine startup torque, and motor torque limit of the hybrid vehicle control device according to the first embodiment in the hybrid vehicle control device.

In the hybrid vehicle control device of the first embodiment, during EV mode, a case will be now studied which the automatic transmission AT selects other than OD transmission step and motor rotation speed Nm falls below to Nm alpha less than the predetermined value Nm0. In this instance, in flowchart shown in FIG. 4, control proceeds from step S1 to step S5 and reads a normal start up torque TmES. Note that the normal startup torque TmES is a value meeting the torque necessary for startup of engine, and corresponds to such torque at motor rotational speed Nm being Nm0 (corresponding to vehicle speed 80 km/h) in the engine startup torque setting map in FIG. 5.

Subsequently, the process proceeds from step S6 to step S7, and subtracting the normal startup torque TmES from maximum motor torque TmMAX to calculate motor torque TmLIM for determination of satisfaction of mode transition conditions.

Moreover, the mode transition conditions such as the required driving torque Td* exceeding motor torque limit TmLIM exist, control proceeds from step S8 to step S9. Thus, the clutch transmission torque passing through the second clutch CL2 will be controlled for clutch engagement capacity to match the driving torque transmitted to driving wheels RL, RR.

At this time, a torque transmission more than the target driving torque is detected, the second clutch CL2 will slip to suppress the engine start shock.

In the hybrid vehicle control device of the first embodiment, a case will now be studied at traveling in the EV mode in which an automatic transmission AT selects a OD step and motor rotational speed Nm is a motor rotational speed NmX at which the motor torque limit TmLIM becomes zero in the hybrid vehicle control device in Comparative Example 1.

Figure 5:
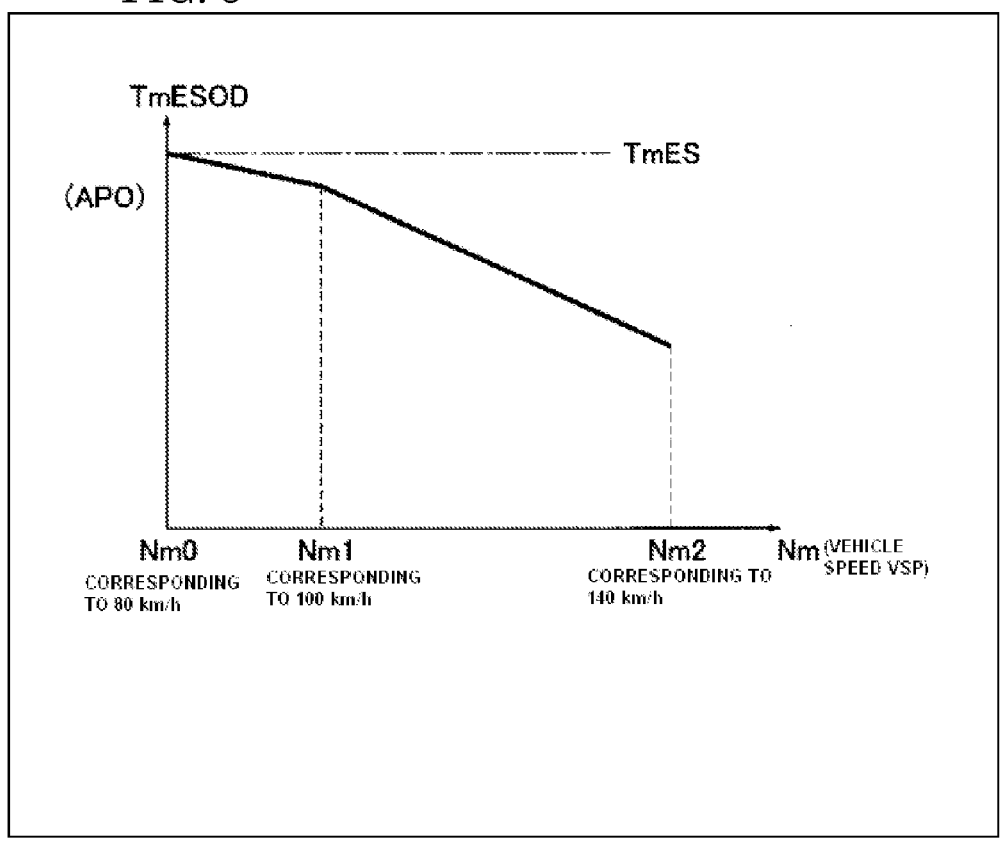
FIG. 5 is a diagram showing a calculation map used in the calculation of the torque for engine start by the integrated controller of the first embodiment.

At this time, control proceeds to step S1 via step S2 through step S3 in the flowchart shown in FIG. 4, where OD startup torque TmESOD will be set based on motor rotational speed NmX and engine startup torque setting map shown in FIG. 5. Note that OD startup torque TmESOD is set smaller than the normal startup torque TmES as an engine startup torque assumed at transmission step other than OD step. More specifically, OD startup torque TmESOD will be set smaller as the transmission ratio is smaller.

Once the OD startup torque TmESOD has been set, the process proceeds from step S4 to step S7, and calculates the motor torque limit TmLIM limit by subtracting OD startup torque TmESOD from maximum motor torque TmMAX to determine whether or not the mode transition condition is established.

At this time, since TmESOD is smaller than TmES, the motor torque limit TmLIM at motor speed NmX will be made larger by ΔTm as compared to Comparative Example 1. That is, the motor torque limit TmLIM at motor rotation speed NmX is not zero, and when the required driving torque Td* is less than the motor torque limit TmLIM, the mode transition condition is not satisfied. Thereby, the process returns to step S1 in the flowchart shown in FIG. 4 and may continue EV driving mode.

In the hybrid vehicle control device of the first embodiment, traveling in the EV mode, a case will now be considered with automatic transmission AT selecting a OD step, and motor rotational speed Nm is at the motor rotation speed NmY shown in FIG. 8. Here, NmX is <NmY.

At this time, control proceeds from step S1 to step S2 and further to step S3 in the flowchart shown in FIG. 4, and based on the NmY motor rotation speed, the engine startup torque setting map shown in FIG. 5, sets the OD startup torque TmESOD. Here, the OD startup torque TmESOD is set to a value smaller than the normal starting torque as the engine startup torque when selecting a transmission ratio other than OD.

Moreover, the engine startup torque setting map has a characteristic that the OD startup torque TmESOD determined by motor rotation speed NmY is smaller than the OD startup torque TmESOD determined by motor speed NmX. Therefore, as motor speed Nm increases, maximum motor torque TmMAX will be decreased, yet with motor torque limit TmLIM being able to raise.

Then, once the OD startup torque TmESOD has been set, process proceeds from step S4 to step S7 and calculates motor torque limit TmLIM by subtracting OD startup torque TmESOD from maximum motor torque TmMAX for determination as to whether or not a mode transition condition is established.

At this time, because the OD startup torque TmESOD is zero, and thus reliably held below the required drive torque Td*, motor transition condition is established and control proceeds from step S8 to step S10.

Note that, as shown in FIG. 9, the engine stop enabling upper limit vehicle speed which is a vehicle speed at a motor rotational speed NmY at which motor torque TmLIM becomes zero will be Vmax2 at OD transmission step (seventh step). Specifically, the engine stop enabling upper limit vehicle speed Vmax2 in the first embodiment is higher than the engine stop enabling upper limit vehicle speed Vmzx1 in Comparative Example 1. Thus, at a relatively high vehicle speed at which a mode transition would occur in Comparative Example 1, the first embodiment ensures a travel or driving in HEV mode at high vehicle speed without invoking a mode transition.

In addition, the engine startup control will be performed by slip controlling the second clutch CL2 to thereby obtaining a required engine startup torque. Specifically, the clutch engagement torque is reduced to decrease the clutch transmission torque passing through the second clutch CL2 thereby to compensate for a difference between the required engine startup torque for starting up engine ENG and OD startup torque In this instance, the transmission torque transmitted to driving wheels RL, RR will be reduces. However, since the automatic transmission AT is operating under selection of OD step, only a slight shock might occur without posing a problem of engine start shock.

Now, technical effects will be explained. In the control device of hybrid vehicle in the first embodiment, various effects will be achieved as enumerated below:

(1) The control device comprises: an engine ENG, a motor (motor/generator) MG disposed in a driveline between engine ENG and driving wheels (left and right driving wheels) RL, RR for both the startup of the engine ENG and drive of driving wheels RL, RR, a mode switching means (first clutch) CL1 disposed a connection portion between the engine ENG and motor MG for selectively switching a hybrid vehicle mode using the engine ENG and motor MG as driving source and an electric vehicle mode using the motor MG as driving source, and a transmission (automatic transmission) disposed between the motor MG and the driving wheels RL, RR, wherein an electric vehicle mode control means is provided in which, as the transmission ratio of the transmission AT decreases, the engine startup torque TmESOD set aside or reserved for mode transition to the hybrid vehicle mode will be made smaller. Therefore, during a travel in the electric mode, by increasing a motor torque limit, a high speed travel may be maintained without transitioning to the hybrid vehicle mode.

(2) The transmission AT is configured as a multi-step automatic transmission and the electric vehicle mode control means (FIG. 4) is configured to set the engine startup torque TmESOD at the transmission AT being selected at the uppermost transmission step smaller than the engine startup torque TmES at the transmission AT being selected at other than the uppermost transmission ratio.

Therefore, in hybrid vehicle to which the multi-step automatic transmission is applied during travel in electric vehicle mode, a high speed travel may be maintained by increasing oar raising the motor torque limit without thereby transitioning to the hybrid vehicle mode.

(3) The transmission AT has an overdrive transmission step as available transmission steps, and the uppermost transmission step is configured to be an overdrive transmission step.

Therefore, while suppressing an engine start shock drastically, during a travel in electric vehicle mode, a high speed travel may be maintained by raising motor torque limit without transitioning to hybrid vehicle mode.

(4) The electric vehicle mode control means (FIG. 4) is configured such that, at selecting the uppermost transmission step, the engine startup torque TmESOD will be smaller as the rotational speed Nm of the motor MG increases.

Therefore, although the maximum motor torque may be decreased as the motor speed increases, the motor torque limit may be raised by holding the engine startup torque to be a small value.

(5) The electric vehicle mode control means (FIG. 4) is configured to set, when the transmission AT selecting the uppermost transmission step and the rotational speed Nm of the motor MG exceeding a predetermined rotational speed Nm0, the engine startup torque TmESOD to be a smaller value than the engine startup torque TmES at the transmission AT selecting other than the uppermost transmission step.

Therefore, the engine startup torque may be set smaller when, during a travel at a constant vehicle speed or more with the uppermost transmission ratio being selected, the shifting operations are relatively stable.

(6) The electric vehicle mode control means (FIG. 4) is configured, when the set engine startup torque TmESOD is smaller than the required torque for engine startup, to include an engine startup control means (Step 19) to perform startup of the engine ENG by reducing a clutch engagement capacity of the clutch (the second clutch CL2) connected at downstream of the motor MG so as to reduce the difference between the torque necessary for engine startup and the set engine startup torque TmESOD.

Therefore, even when the engine startup torque has been set for small value, the torque necessary for engine startup may be secured for a reliable mode transition.

The control device of hybrid vehicle according to the present invention has been described with reference to the first embodiment. The specific configurations are not limited to this first embodiment, but design changes or additions are allowed without departing from the spirit of the invention according to each claim as described in Claims.

Although in the electric vehicle mode control means of the hybrid vehicle control device in the first embodiment, the engine startup torque at the uppermost, seventh transmission ratio of overdrive is set smaller than the engine startup torque at the automatic transmission AT being selected other than overdrive step, this configuration is not restrictive.

For example, in a case of an automatic transmission of three transmission speeds, and when the transmission speed at the third, uppermost transmission ratio is "1", the engine startup torque at the uppermost transmission step (i.e., third speed at transmission ratio "1") is set smaller than that when other transmission ratios are selected.

Even in this case, by suppressing the engine start shock, during a travel in electric vehicle mode, a high speed travel in electric mode may be maintained without transitioning to hybrid vehicle mode by raising motor torque limit.

In addition, the automatic transmission AT is configured to be a multi-step transmission. This may be a continuously variable transmission. In this case, as the transmission ratio decreases, engine startup torque TmESOD will be set smaller.

Figure 10A:
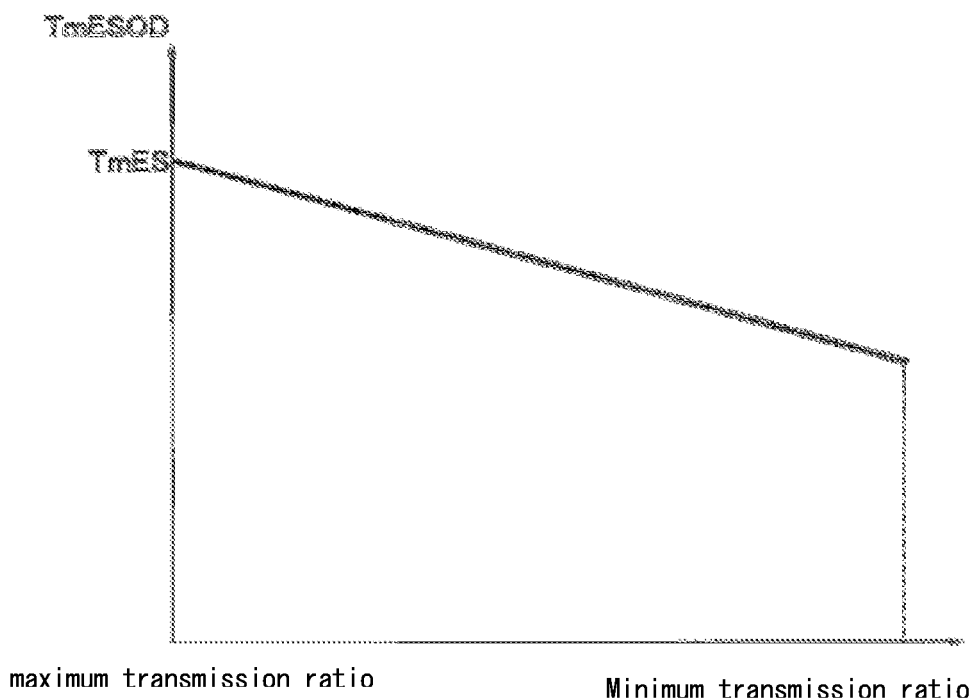
FIG. 10A is a diagram showing another example of the calculation map used for calculation of the engine startup torque.

In this instance. as shown in FIG. 10A, the engine startup torque TmESOD may be set for the torque (TmES) necessary for engine startup at the maximum transmission ratio and may be then decreased gradually in accordance with decrease in transmission ratio.

Figure 10B:
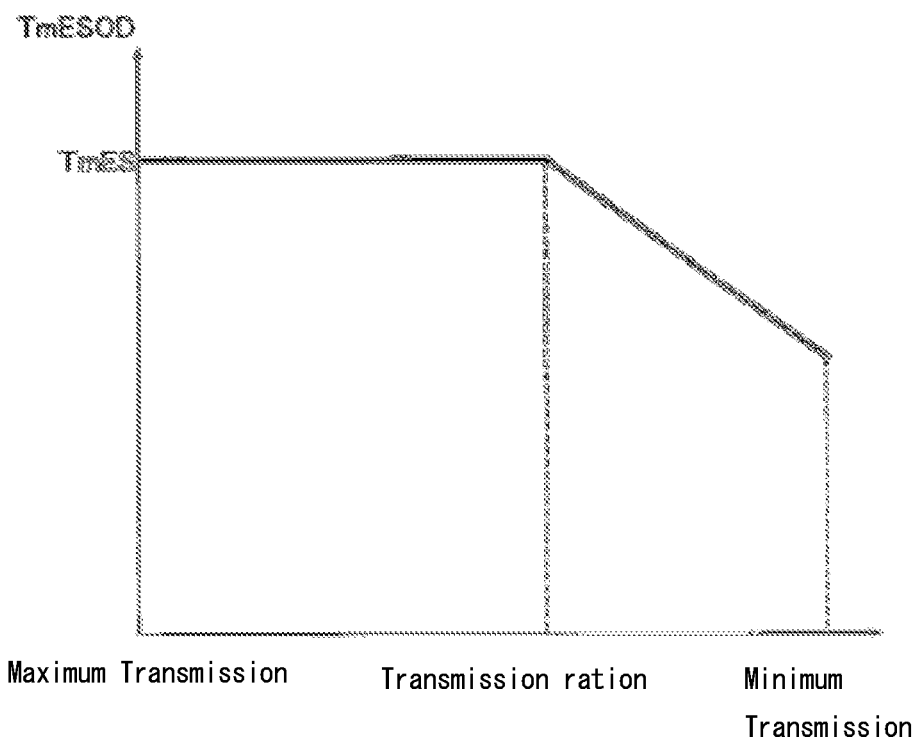
FIG. 10B is a diagram showing still another example of the calculation map used for calculation of the engine start.

Moreover, as shown in FIG. 10B, within a range between the maximum transmission ratio and an equal speed transmission ratio (i.e., transmission ratio=1), the engine startup torque TmESOD is set to the torque necessary for engine startup (TmES), and as the transmission ratio becomes smaller, in accordance with decrease in transmission ratio, engine startup torque TmESOD will be gradually decreased. Note that in this instance the reference transmission ratio for setting the engine startup torque TmESOD to a fixed value (TmES) may be set on an arbitrary basis irrespective of the equal speed transmission ratio.

In addition, even when applying the continuously variable transmission as the transmission, engine startup torque may be set smaller as the motor rotational speed increases. Specifically, even at the transmission ratio being the same in the continuously variable transmission, engine startup torque will be made smaller at the higher motor speed.

Therefore, although the maximum available motor torque will be decreased as the motor rotational speed increases, by holding the engine startup torque as a smaller value, motor torque limit may be raised.

Moreover, in the first embodiment, by slop controlling the second clutch CL2 for compensating for the engine startup torque by such a surplus motor torque not transmitted to driving wheels RL, RR. This configuration is not limitative, however. The compensation of engine startup torque may be perfumed by controlling the clutch engagement capacity of the first clutch CL1 to increase the motor torque for transmission to engine ENG. More specifically, the increase of engagement force of the first clutch CL1 will lead to the corresponding increase of the motor torque passing through the first clutch CL1, thus this increased amount may compensate for the engine startup torque.

Note that by controlling the clutch engagement torques of first and second clutch CL1 and CL2, respectively, engine startup torque necessary may be compensated for.

Moreover, in the first embodiment, the first clutch CL1 has been configured as mode switching means, travel mode may be equally changed by a differential gear mechanism, for example. In addition, although motor/generator MG possesses a regenerative function, the configuration without such regenerative function may be equally applicable.

Furthermore, in the first embodiment, although the seventh speed has been selected for an overdrive transmission step, the fifth speed may be configured to be of equal speed step while the sixth and seventh speed as overdrive steps. The overdrive step may be any transmission steps whose transmission ratio is "1.0" or more regardless of the number of transmission steps.

In addition, in the automatic transmission AT in the first embodiment, an example has been shown in which the second clutch CL2 is selected out of friction elements housed within the multi-step automatic transmission AT the second clutch CL2 may be provided separately from automatic transmission AT. More specifically, such an example in which the second clutch CL2 is provided separately from automatic transmission AT between motor/generator MG and transmission input shaft, or another example in which the second clutch CL2 is provided separately from automatic transmission AT between the transmission output shaft and driving wheels may be included.

Moreover, in the first embodiment, the application example has been shown to FR hybrid vehicle of one-motor-two-clutch type. The present invention may be applicable to the other type of FR or FR hybrid vehicles.

The invention claimed is:

1. A control device for a hybrid vehicle comprising:
   an engine;
   a motor disposed in a driveline between the engine and driving wheels;
   a first clutch for selectively switching between a hybrid vehicle mode using the engine and the motor as a driving source, and an electric vehicle mode using the motor as the driving source;
   a transmission disposed between the motor and the driving wheels; and
   an electric vehicle mode controller configured to:
      during a travel in the electric vehicle mode when a transmission ratio is at or less than a predetermined value, set an engine startup torque preserved for transition to the hybrid vehicle mode to a smaller torque than a required torque for engine startup;
      set the engine startup torque smaller as the transmission ratio decreases; and
      reduce a clutch engagement capacity of a second clutch selectively engaged downstream of the motor by a difference between the required torque for engine startup and the set engine startup torque, thereby compensating the required torque for engine startup.

2. The control device for hybrid vehicle as claimed in claim 1, wherein the transmission is configured as a multi-step automatic transmission and the electric vehicle mode controller is configured to set the engine startup torque with the transmission being selected at an uppermost transmission step smaller than the required torque for engine startup with the transmission being selected at other than the uppermost transmission step.

3. The control device for hybrid vehicle as claimed in claim 2, wherein the transmission has an overdrive transmission step as an available transmission step, and the uppermost transmission step is configured to be the overdrive transmission step.

4. The control device for hybrid vehicle as claimed in claim 3, wherein the electric vehicle mode controller is further configured such that, during selecting the uppermost transmission step by the transmission, the engine startup torque will be set smaller as a rotational speed of the motor increases.

5. The control device for hybrid vehicle as claimed in claim 4, wherein the electric vehicle mode controller is further configured such that, during selecting the uppermost transmission step by the transmission, the engine startup torque will be set smaller as the rotational speed of the motor increases.

6. The control device for hybrid vehicle as claimed in claim 4, wherein when the transmission selects the uppermost transmission step and a rotational speed of the motor exceeds a predetermined rotational speed, the electric vehicle mode controller is further configured to set the engine startup torque to be a smaller value than the required torque for engine startup during the transmission selecting other than the uppermost transmission step.

7. The control device for hybrid vehicle as claimed in claim 2, wherein when the transmission selects the uppermost transmission step and a rotational speed of the motor exceeds a predetermined rotational speed, the electric vehicle mode controller is further configured to set the engine startup torque to be a smaller value than the required torque for engine startup during the transmission selecting other than the uppermost transmission step.

\* \* \* \* \*